SYSTEM FOR DETECTING A SIGNAL IN THE PRESENCE OF NOISE

Filed Feb. 12, 1958 2 Sheets-Sheet 1

EMORY LAKATOS
INVENTOR.

BY Albert Rosen
Morris Spector

ATTORNEYS

Jan. 31, 1961 E. LAKATOS 2,970,304

SYSTEM FOR DETECTING A SIGNAL IN THE PRESENCE OF NOISE

Filed Feb. 12, 1958

2 Sheets-Sheet 2

EMORY LAKATOS
INVENTOR.

BY Albert Rosen
Morris Spector
ATTORNEYS

United States Patent Office 2,970,304
Patented Jan. 31, 1961

2,970,304

SYSTEM FOR DETECTING A SIGNAL IN THE PRESENCE OF NOISE

Emory Lakatos, Los Angeles, Calif., assignor, by mesne assignments, to Thompson Ramo Wooldridge Inc., Cleveland, Ohio, a corporation of Ohio Filed Feb. 12, 1958, Ser. No. 714,768

18 Claims. (Cl. 340—248)

This invention relates to a system for detecting the presence of an information signal component in a composite information and noise signal. In particular, the invention relates to a system adapted to detect the presence or absence of an information signal having one frequency characteristic in a noise environment having a frequency characteristic different from that of the information signal. While not limited thereto, the invention is herein described with reference to the detection of the presence or absence of a substantially unifrequency sine wave information signal component in an incoming radio frequency signal containing a noise signal component with a wider frequency band width than that of the information signal component to be detected. The invention proves especially advantageous in the detection of the presence or absence of the information signal on a go, no go basis when the signal to noise ratio is as low as 1 or less.

According to the invention use is made of the phenomenon wherein, if a substantially unifrequency information signal (for example a sine wave signal) and a noise signal are passed through certain non-linear devices, the information signal will modulate the noise so that the noise power at the output of the device will be less in the presence of the information signal than in the absence of it. This phenomenon is used, according to the invention, in providing information as to the presence of the information signal; an appropriate utilization device, such as a light or alarm signal, is connected to be actuated by the detection of the presence of the information signal, or more properly, by the reduction in the power content of the noise in the incoming signal sample.

In the detecting system of the invention a frequency selective or discriminator circuit, of the type capable of converting frequency changes into marked voltage changes, is used to separate an input signal having noise and information components into a transformed signal having an alternating current portion and a substantially direct current portion. The alternating current portion, representative of the noise component of the input signal, is fed into a power measuring device, such as a fast-acting thermocouple, to give an indication of the power content of the alternating current noise-representing signal. Since the power content of the noise-representing signal is larger in the absence of an incoming information signal component than in the presence of such a component, a low power content indicates the presence of an information signal. The power content indication signal from the power measuring device is fed to a comparing circuit where the magnitude of this signal is compared with a reference; a power-representing magnitude larger than the reference indicates the absence of an information signal, while a magnitude smaller than the reference indicates the presence of an information signal.

In the drawings, wherein like reference characters refer to like parts:

Environments are known wherein it is desirable to detect, on a go, no go basis, the presence or absence of an information signal component in an incoming signal having a large noise level. For example, in detecting the presence of a radar target it is desirable to know when a radar return signal is present even though the character of the return signal cannot be deciphered due to a high ambient noise level. Thus, for example, in an aircraft radar set designed to indicate the possibility of a collision with another aircraft, it is desirable to know of the presence of the other aircraft in the vicinity. Consequently, the mere presence of a radar return signal provides the information desired. The system of the invention enables the foregoing to be realized even when the noise level is higher than the level of the information signal. The system of the invention may be used, for example, in a collision warning arrangement of the kind described in a copending application Serial No. 587,768, filed May 28, 1956, and assigned to the same assignee as the present application.

Figure 1:
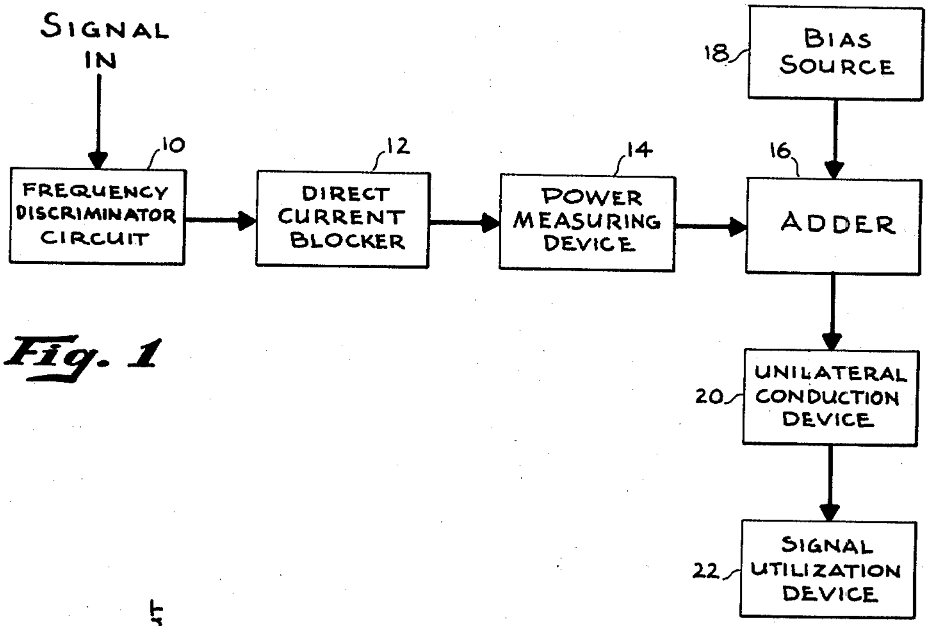
Figure 1 is a block diagram illustrating a signal detecting system embodying the invention.

A block diagram of the system of the invention is illustrated in Figure 1. An incoming signal is fed into a frequency selective or discriminating circuit 10, a non-linear signal transformation circuit that provides a large change in output voltage magnitude for a small change in signal input frequency, for example a change in voltage magnitude of the order of 15 millivolts for a frequency change of one cycle. Such circuits are well known in the art and may be, for example, one of the known limiter-discriminator circuits described in Section 7, paragraph 18, pages 585 to 588, "Radio Engineer's Handbook," by Frederick E. Terman, published in 1943 by the McGraw-Hill Book Company, New York. The output from the frequency discriminator circuit 10 is fed into a direct current blocking circuit 12 where substantially only the alternating current component of the signal is allowed to pass. The output from the direct current blocking circuit 12 is fed into a power measuring device 14, such as one of the known fast-acting thermocouples, and the signal from the power measuring device, representative of the power level of the alternating current component, is fed into a comparing circuit such as an adder 16.

The adder 16 issued in providing an indication as to whether the measured power is relatively small, indicating the absence of an information signal component in the original, incoming signal, or is relatively large, indicating the presence of the information signal component. A reference or bias signal, from a bias source 18, is also fed into the adder circuit 16. The power representing signal, from the power measuring device 14, and the bias signal, from the bias source 18, are of opposite polarity. The algebraic sum of these two signals, a resultant signal having the polarity of the larger of the bias or power representing signals, is fed through a unilateral conduction device 20, such as a rectifier, for passing only a resultant signal when it has the polarity of a predetermined one or the other of the bias or power representing signals. For example, the unilateral conduction device 20 may be oriented to pass only signals of the polarity of the bias signal. Under these circumstances a signal will be passed through the unilateral conduction device 20 only when the magnitude of the power representing signal into the adder 16 is lower than a predetermined value, representing the absence of appreciable noise power in the original incoming signal (corresponding to the presence of an information signal component in the input signal to the system). The output from the unilateral conduction device 20 is fed into a signal utilization device 22, which may for example be an alarm circuit, for indicating the presence of the information signal component.

The operation of the system of the invention will now be discussed. As is known, a frequency selective circuit that transforms frequency changes into voltage changes, such as a frequency discriminator circuit of the type referred to, transforms an input signal frequency change into an output signal voltage level change. Thus, when a substantially constant frequency input signal (for example a constant frequency, information component, sine wave signal) is applied to the discriminator circuit, this circuit will provide a substantially constant level or substantially direct current output signal 26*b*. However, the noise component accompanying the substantially constant frequency sine wave signal component will have a random variation in frequency since the noise signal component has a wider band width than that of the substantially unifrequency signal. Thus, when the noise component passes through the discriminator circuit the discriminator circuit will provide an output signal having voltage variations corresponding to the frequency variations of the input noise signal. Consequently, the output from the discriminator will have a changing voltage level (for convenience this changing voltage level will be referred to as an alternating current although in reality the current may be a unipolarity current having relatively large amplitude variations). This changing voltage level is representative of the noise component input to the discriminator. Since the information signal is now represented by the substantially direct current component of the discriminator output while the noise component is represented by the alternating current component of the output, when the output from the discriminator circuit is passed through a capacitor 32 the information signal component will be blocked and only the noise level component will pass.

Figure 4:
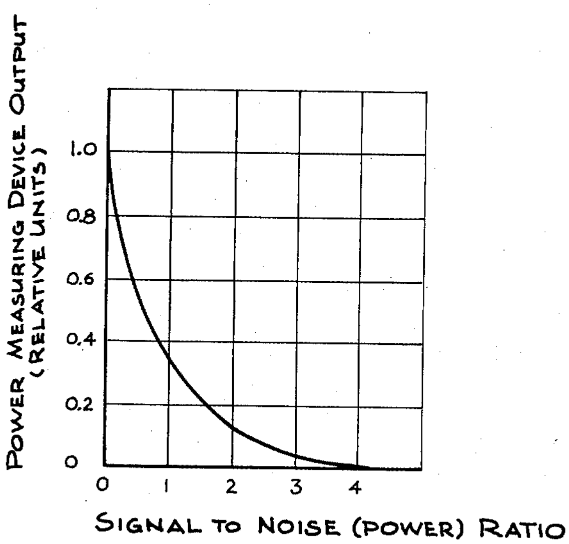
Figure 4 is a graphical illustration of the sensitivity of a detecting system embodying the invention.

In the absence of an information signal component in the incoming composite signal to the discriminator circuit the noise signal component constitutes the entire signal input to the circuit and provides a given alternating current power level output. In the presence of an information signal component, however, this information component will modulate the noise component. Consequently, the noise power level at the output of the circuit will be less in the presence of the information component than in the absence of it. Even in the presence of a weak information signal component at the input to the circuit, the power level of the noise component at the output of the circuit is markedly reduced in comparison to the power level of the noise component in the absence of the information component. The basic principles underlying this phenomenon are stated in mathematical terms in an article entitled "Statistical Properties of a Sine Wave Plus Random Noise," by S. O. Rice, in the Bell System Technical Journal, pages 109 to 157, January 1948, in particular Figure 8 of this article. As illustrated in Figure 4, a derivation from Figure 8 in the article referred to, the power level of the noise component of the signal drops to about 60 percent of its original value when the signal to noise ratio increases from 0 to .5. This means that the presence of an information signal may be detected even when there is twice as much noise present as there is signal. Of course, when the signal to noise ratio is higher the noise power drops even lower. Thus, for example, with a signal to noise ratio of 2 to 1 the noise power drops to 10 percent of that present in the absence of any information signal.

Thus it is seen that the power level of the signal passing through the blocking capacitor 32 will be markedly less during time intervals when an information signal component is received by the system than during time intervals when no information signal component is present. The difference in the blocking capacitor output signal when an information signal component is absent, relative to the output when such a signal is present, depends upon the signal to noise ratio of the over-all composite signal input to the limiter-discriminator circuit. When the signal to noise ratio is of the order of 1 to 1 the reduction in noise component power is of the order of 65 percent of its value in the absence of any information signal, as illustrated in Figure 4.

Figures 2, 3:
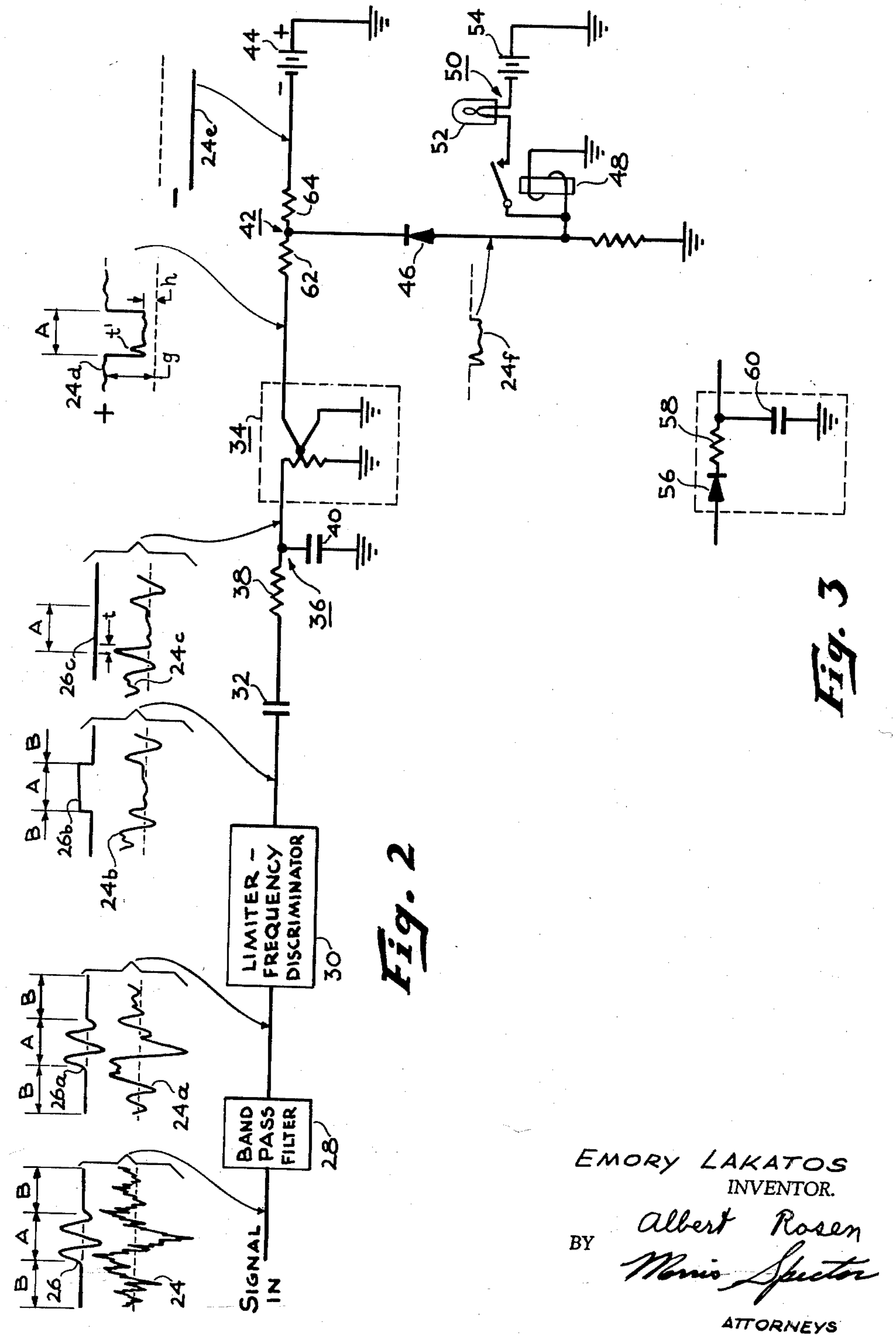
Figure 2 is a partially schematic diagram illustrating the operation of a system of the type illustrated in Figure 1.
Figure 3 is a schematic illustration of an alternate form of a portion of a system illustrated in Figure 2.

The foregoing system will now be described in greater detail in connection with Figure 2. The incoming composite information and noise signal is graphically illustrated in Figure 2 with a depiction of a noise level component, graph line 24, and an information signal component, graph line 26. The coordinates of the graph line depict signal amplitude over time. For convenience of explanation let us suppose that during time periods B no information signal component is present, and then during time periods A an information signal component is present. The incoming composite signal, graph lines 24 and 26, is passed through a band pass filter 28 for removing the portions of the noise signal component that are appreciably above and below the frequency of the information signal component, the filter having a wide enough pass band to pass substantially the entire information signal component, a substantially sine wave signal. The noise and information components in the signal emerging from the band pass filter 28 are illustrated by graph lines 24*a* and 26*a*. The output from the band pass filter 28 is passed through a limiter-frequency discriminator circuit 30 of the type referred to, having frequency discriminating action at the frequency of the information component. In the discriminator circuit 30 the relatively uniform information signal component 26*a* is transformed into a unipolar or substantially direct current signal portion 26*b* and the noise component 24*a* is transformed into an alternating current signal portion 24*b*. For the reasons described in the article referred to the noise representing alternating current portion 24*b* has a relatively large magnitude during the time B that an information signal component is not present and a relatively small magnitude during the time A that an information signal component is present. The composite output signal 24*b* and 26*b* from the limiter-frequency discriminator circuit 30 is fed into a direct current blocking circuit, which may comprise a capacitor 32, for substantially removing the direct current component 26*c* from the composite signal and passing substantially only the alternating current component 24*c*. Thus, the information signal component, represented by the substantially direct current level, is not present while the noise signal component, represented by the alternating current level, has a markedly reduced magnitude during the time period A during which the information signal component was present. The alternating current component has a small transient, *t*, produced by the sudden presentation of the information signal component to the capacitor 32. However, as will be shown, the presence of this transient has substantially no effect on the operation of the system.

The output from the blocking capacitor 32 is fed into a power measuring device such as, for example, a thermocouple 34 of a known type having a relatively fast response time. The thermocouple is preferably of a variety having a response time of appreciably less than one second, for example from of the order of $1/100$ to of the order of $1/1000$ of a second. Since such thermocouples are known in the art they will not be further described. A low pass filter 36, for example an R-C filter comprising a resistor 38 and capacitor 40, is preferably connected between the blocking capacitor 32 and the thermocouple 34 for blocking alternating current having a frequency higher than that which the thermocouple is capable of responding to. This filter 36 substantially eliminates harmonics and aids in the restriction of power into the thermocouple 34 to only the desired signals. Since the magnitude of the alternating current fluctuations during the absence of an information signal is greater than the magnitude of the fluctuations during the presence of the information signal, the power measured by the thermocouple, represented by a unipolar power representing signal 24*d*, will be greater during the time period corresponding to the absence of an information signal than that during the presence of an information signal. The aforementioned transient *t* will be present as a small power pip *t'*. The power representing output signal from the thermocouple 34 may have either a positive or negative unipolarity. In the embodiment shown by way of example the power representing signal is chosen to have a positive polarity.

This power representing signal 24*d* is fed into one of two inputs to a comparing or adder circuit 42. A bias signal 24*e*, from a bias signal source 44, is fed into the other input to the adder circuit 42. The bias signal 24*e* has a polarity opposite that of the power representing signal 24*d* from the thermocouple 34 and an absolute magnitude intermediate that between the lowest amplitude *g* of the no-information-signal representing portion of signal 24*d* and the amplitude *h* of the signal information representing portion of signal 24*d*. The absolute magnitudes of the two signals 24*d* and 24*e* are compared by being algebraically added by the adder circuit 42, and the sum of these signals is fed to a unipolarity conducting device such as a rectifier 46 oriented to pass only one of the larger of the signals representing the bias signal 24*e* and the power representing signal 24*d*. In the embodiment shown by way of example the rectifier 46 is oriented to pass only negative signals. Thus, only the bias signal 24*e* will be passed, and then only during such periods of time that the absolute magnitude of the bias signal 24*e* is larger than that of the power representing signal 24*d*. The foregoing condition is present only during the time interval A. Consequent, an output from the rectifier 46, represented by wave form 24*f* is present only during the time period corresponding to the time during which an information signal was present in the original incoming signal.

The rectifier output signal 24*f* is fed through a go, no go indicating device, such as a relay 48, for controlling an appropriate alarm circuit 50. The alarm circuit is here represented by a light bulb 52 connected to be energized by a battery 54. Since the power pip *t'* occurs for only a small fraction of the time A during which an information signal component is present, the presence of this pip will not interfere with the indication of the presence of the information component. Thus, in the circuit illustrated the lamp 52 will be illuminated during time intervals corresponding to the intervals A during which an information signal was present in the original incoming signal. Consequently, as has been explained above in connection with Figure 4, even a change in signal to noise ratio as small as from 0 to 1 to .5 to 1 will be detected by the circuit. The detection level, the sensitivity of the circuit of Figure 2, is determined by the absolute magnitude of the bias signal level 24*e* relative to the absolute value of the power representing signal level 24*d*. The greater the magnitude of the bias signal level relative to signal level *g* (the bias signal level magnitude always being less than that of the signal *g*) the higher the sensitivity of the circuit to the presence of an information signal. However, as is realized, an increased sensitivity of the circuit to an information signal component is accompanied by a corresponding reduction in selectively of the circuit to false alarms, that is, to random noise that may happen to look to the system like an information signal. Thus, if a larger number of false alarms can be tolerated, the circuit may be made sensitive to signal to noise ratios as small as a very small fraction of 1.

While the invention has been described with respect to circuit elements of a particular type for convenience of explanation, it will be appreciated that equivalent circuits may instead be used. For example, while the power measuring device of the invention has been illustrated in Figure 2 as being a thermocouple 34, it may instead be a different power measuring device. Thus, as illustrated in Figure 3, the power measuring device may instead be an integrating network including a rectifier 56 and an R-C circuit made up of a resistor 58 and capacitor 60. Similarly, while the added 42 is illustrated for convenience as comprising two resistors 62 and 64 with an output tap from a center point between the resistors, the adder may instead take a different form, for example the form of an adder circuit capable of providing an amplified output. Since such adder circuits are well known in the art they will not be described here.

Since the unifrequency information signal 26 provides the same reduction in measured noise power regardless of the frequency of the information signal, provided this frequency is within the limits of the non-linear response characteristic of the discriminator circuit 30, the system proves especially advantageous in detecting the presence of a return signal in a Doppler radar set, where the substantially unifrequency return signal is characterized by a very slow change in frequency. As long as the frequency of this return signal lies within the frequency operating limits of the discriminator circuit 30, the only effect of the slow frequency change will be a corresponding slow change in the magnitude of the direct current output from the discriminator circuit. This slow change in direct current magnitude with change in frequency is illustrated by the slow rising characteristic of the wave form representing the direct current signal portion 26*b* during time interval A. Since, as has been explained, this direct current output is not used in the system of the invention, the change in magnitude of the direct current output does not affect the signal detecting ability of the system.

From the foregoing it is seen that the improved information signal detecting system of the invention provides an indication of the presence of an information signal even when the noise level accompanying the information signal is greater than that of the signal level, and even when, as is the case in a Doppler radar return signal, the frequency of the information signal is subject to change.

What is claimed is:

1. A detecting system, comprising: frequency selective means adapted to receive an input signal having noise and information components and constructed to convert said input signal into a transformed signal having an alterating current component, representative of the noise component of said input signal, and a substantially direct current component representatives of said information component; blocking means connected to said frequency selective means for receiving said transformed signal therefrom and adapted to remove said substantially direct current component from said transformed signal and to pass said alternating current component which is varied an amount functionally related to the removed information component; power measuring means coupled to said blocking means for receiving said alternating current component therefrom and constructed to convert said alternating current component into a signal representative of the power in said alternating current component; a bias voltage source; and comparing means connected to receive a bias voltage from said voltage source and to receive said power representing signal from said power measuring means and constructed to provide an output signal representative of the larger of said bias and power signal levels.

2. The system claimed in claim 1 wherein said frequency selective means comprises a limiter-frequency discriminator circuit.

3. In a system for detecting the presence of a Doppler radar information signal, lying in a predetermined frequency band, in a noise environment; and wherein the signal to noise ratio is of the order of 1 to 1 or less: the combination of a limiter-discriminator circuit having a non-linear discriminator response characteristic over said frequency band and adapted to receive an input signal having an information component representative of said radar information signal and a noise component, and constructed to convert said input signal into a transformed signal having an alternating current component, representative of the noise component of said input signal, and a substantially direct current component representative of said information component; blocking means connected to said limiter-discriminator circuit for receiving said transformed signal therefrom and adapted to remove said substantially direct current component from said transformed signal and to pass said alternating current component; power measuring means coupled to said blocking means for receiving said alternating current component therefrom and constructed to convert said alternating current component into a unipolarity signal representative of the power in said alternating current component; a bias voltage source connected to provide a direct current bias voltage signal of a polarity opposite that of said power representing signal; comparing means connected to receive said bias voltage signal from said voltage source and to receive said power representing signal from said power measuring means, and constructed to provide an output signal with a polarity the same as that of the larger of said bias and power signals; a unilateral conduction device connected to receive said output signal from said comparing means and to pass a signal representative of only one of said bias and power signals when said one signal is larger than the other; and a signal utilization device connected to respond to the passage of said one signal through said device.

4. A detecting system, comprising: frequency selective signal transformation means adapted to receive an input signal having noise and information components and constructed to convert said input signal into a transformed signal having an alternating current component, representative of the noise component of said input signal, and a substantially direct current component; blocking means connected to said transformation means for receiving said transformed signal therefrom and adapted to receive said substantially direct current component from said transformed signal and to pass said alternating current component; power measuring means coupled to said blocking means for receiving said alternating current component therefrom and constructed to convert said alternating current component into a unipolarity signal representative of the power in said alternating current component; a bias voltage source connected to provide a direct bias voltage signal of a polarity opposite that of said power representing signal; comparing means connected to receive said bias voltage signal from said voltage source and to receive said power representing signal from said power measuring means, and constructed to provide an output signal with a polarity the same as that of the larger of said bias and power signals; a unilateral conduction device connected to receive said output signal from said comparing means and to pass a signal representative of only said power signal when said power signal is larger than said bias signal; and a signal utilization device connected to respond to the passage of said power signal through said device.

5. A detecting system, comprising: limiter-frequency discriminator means adapted to receive an input signal having noise and information components and constructed to convert said input signal into a transformed signal having an alternating current component, representative of the noise component of said input signal, and a substantially direct current component; blocking means connected to said limiter-frequency discriminator means for receiving said transformed signal therefrom signal therefrom and adapted to remove said substantially direct current component from said transformed signal and to pass said alternating current component; power measuring means coupled to said blocking means for receiving said alternating current component therefrom and constructed to convert said alternating current component into a unipolarity signal representative of the power in said alternating current component; a bias voltage source connected to provide a direct current bias voltage signal of a polarity opposite that of said power representing signal; comparing means connected to receive said bias voltage signal from said voltage source and to receive said power representing signal from said power measuring means, and constructed to provide an output signal with a polarity the same as that of the larger of said bias and power signals; a unilateral conduction device connected to receive said output signal from said comparing means and to pass a signal representative of only one of said bias and power signals when said one signal is larger than the other; and a signal utilization device connected to respond to the passage of said one signal through said device.

6. A detecting system, comprising: frequency discriminator means adapted to receive an input signal having noise and information components and constructed to convert said input signal into a transformed signal having an alternating current component, representative of the noise component of said input signal, and a substantially direct current component representative of said information component; blocking means connected to said discriminator means for receiving said transformed signal therefrom and adapted to remove said substantially direct current component from said transformed signal and to pass said alternating current component which is reduced an amount functionally related to the removed information component; thermocouple means coupled to said blocking means for receiving said alternating current component therefrom and constructed to convert said alternating current component into a signal representative of the power in said alternating current component; a bias voltage source, and an adder circuit connected to receive a bias voltage from said voltage source and to receive said power representing signal from said thermocouple means and constructed to provide an output signal representative of the larger of said bias and power signal levels.

7. A detecting system, comprising: non-linear frequency selective signal transformation means adapted to receive an input signal having noise and information components and constructed to convert said input signal into a transformed signal having an alternating current component, representative of the noise component of said input signal, and a substantially direct current component representative of said information component; blocking means connected to said transformation means for receiving said transformed signal therefrom and adapted to remove said substantially direct current component from said transformed signal and to pass said alternating current component which is varied an amount functionally related to the removed information component; a thermocouple coupled to said blocking means for receiving said alternating current component therefrom and constructed to convert said alternating current component into a signal representative of the power in said alternating current component; a bias voltage source; and comparing means connected to receive a bias voltage from said voltage source and to receive said power representing signal from said thermocouple and constructed to provide an output signal representative of the larger of said bias and power signal levels.

8. A detecting system for an information signal component lying in a predetermined frequency band, comprising: a band-pass filter adapted to receive an input signal having a noise component and said information component; a limiter-discriminator circuit, frequency selective to frequencies lying within said band, and connected to receive a filtered output signal from said filter and to convert said output signal into a transformed signal having an alternating current component, representative of the noise component of said input signal, and a substantially direct current component representative of said information component; blocking means connected to said discriminator circuit for receiving said transformed signal therefrom and adapted to remove said direct current component from said transformed signal and to pass said alternating current component which is reduced an amount functionally related to the removed information component; power measuring means having a predetermined upper frequency response; a filter connecting said measuring means to said blocking means; said power measuring means being constructed to convert an alternating current component received from said blocking means into a signal representative of the power in said alternating current component; a bias voltage source; and comparing means connected to receive a bias voltage from said voltage source and to receive said power representing signal from said power measuring means and constructed to provide an output signal representative of the larger of said bias and power signal levels.

9. The system claimed in claim 8 wherein said power measuring means comprises a thermocouple having a response time of appreciably less than one second.

10. A detecting system for an information signal component lying in a predetermined frequency band, comprising: a band-pass filter adapted to receive an input signal having a noise component and said information component; a limiter-discriminator circuit, frequency selective to frequencies lying within said band, and connected to receive a filtered output signal from said filter and to convert said output signal into a transformed signal having an alternating current component, representative of the noise component of said input signal, and a substantially direct current component; capacitor means connected to said discriminator circuit for receiving said transformed signal therefrom and adapted to remove said direct current component from said transformed signal and to pass said alternating current component; power measuring means having a predetermined upper frequency response; an R-C filter connecting said measuring means to said capacitor means and having an upper frequency response of generally the same order as that of said measuring means; said power measuring means being constructed to convert an alternating current component received from said capacitor means into a signal representative of the power in said alternating current component; a bias voltage source; and comparing means connected to receive a bias voltage from said voltage source and to receive said power representing signal from said power measuring means and constructed to provide an output signal representative of only the larger of said bias and power signal levels.

11. The system claimed in claim 10 wherein said power measuring means comprises an integration network.

12. A signal detecting system, comprising: a limiter-discriminator circuit frequency selective to a predetermined frequency band and adapted to receive an input signal having noise and information components lying within said frequency band and constructed to convert said input signal into a transformed signal having an alternating current component, representative of the noise component of said input signal, and a substantially direct current component; a blocking capacitor connected to said circuit for receiving said transformed signal therefrom and adapted to remove said substantially direct current component from said transformed signal and to pass said alternating current component; a power measuring circuit coupled to said blocking capacitor for receiving said alternating current component therefrom and constructed to convert said alternating current component into a unipolarity signal representative of the power in said alternating current component; a bias voltage source connected to provide a direct current bias voltage signal of a polarity opposite that of said power representing signal; signal adding means connected to receive said bias voltage signal from said voltage source and to receive said power representing signal from said power measuring circuit, and constructed to provide an output signal with a polarity the same as that of the larger of said bias and power signals; a rectifier connected to receive said output signal from said adding means and to pass a signal representative of only one of said bias and power signals when said one signal has an absolute magnitude larger than the other; and a go-no go signal utilization device connected to respond to the passage of said one signal through said device.

13. A signal detecting system, comprising: a limiter-discriminator circuit frequency selective to a predetermined frequency band and adapted to receive an input signal having noise and information components lying within said frequency band and constructed to convert said input signal into a transformed signal having an alternating current component, representative of the noise component of said input signal, and a substantially direct current component; a blocking capacitor connected to said circuit for receiving said transformed signal therefrom and adapted to remove said substantially direct current component from said transformed signal and to pass said alternating current component; a power measuring circuit coupled to said blocking capacitor for receiving said alternating current component therefrom and constructed to convert said alternating current component into a positive direct current signal representative of the power in said alternating current component; a bias voltage source connected to provide a negative direct current bias voltage signal; signal adding means connected to receive said bias voltage signal from said power measuring circuit, and constructed to provide an output signal with a polarity the same as that of the larger of said bias and power signals; a rectifier having a negative terminal connected to said adding means and adapted to receive said output signal from said adding means and to pass a signal only when said bias signal has an absolute magnitude larger than said power representing signal; and a go-no go signal utilization device connected to respond to the passage of said one signal through said device.

14. The system claimed in claim 13 wherein said power measuring circuit is a thermocouple having a response time of appreciably less than one second.

15. The system claimed in claim 13 wherein said power measuring circuit is an integrating network.

16. In a signal detecting system of the kind adapted to sense the presence of a substantially unifrequency information signal in a signal environment having a frequency band broader than that of said information signal; the combination of frequency selective signal transformaiton means responsive to the frequency of said information signal and to at least a portion of said frequency band adjacent thereto; a signal power measuring device; said transformation means being connected to provide an alternating current signal having a predetermined power content in the absence of said information signal thereto and a power content less than said predetermined power content in the presence of said information signal; and said measuring device being connected to provide an output signal representative of the power contained in the alternating current output of said transformation means.

17. In a signal detecting system of the kind adapted to detect the presence of a substantially unifrequency information signal in a signal environment having a frequency band substantially including the frequency of said unifrequency signal; the combination of a discriminator circuit responsive to the frequency of said information signal and to at least a portion of said frequency band adjacent thereto; a signal power measuring device; and a comparing circuit; said discriminator circuit being connected to provide an alternating current signal having a predetermined power content in the absense of said information signal and a power content less than said predetermined power content in the presence of said information signal; said measuring device being connected to provide an output signal representative of the power contained in the alternating current output of said discriminator circuit; and said comparing circuit being connected to provide an output indicative of the relative power contents of said information signal and said signal environment.

18. In a signal detecting system of the type adapted to sense the presence of a substantially unifrequency information signal in a noise environment having a frequency band including the frequency of said information signal; the combination of a limiter-discriminator circuit frequency selective to said frequency and to at least a portion of said frequency band adjacent thereto, a signal power measuring device, and a comparing circuit; said limiter-discriminator circuit being connected to provide an alternating current signal having a predetermined power content in the absence of said information signal thereto, said measuring device being connected to provide an output signal representative of the power contained in the alternating current output of said limiter-discriminator circuit; and said comparing circuit being connected to compare said power representing signal with a predetermined bias level and provide an output signal representative of the presence of said information signal.

References Cited in the file of this patent

UNITED STATES PATENTS

| | | |
|---|---|---|
| 1,663,086 | Long | Mar. 20, 1928 |
| 2,163,747 | Crosby | June 27, 1939 |
| 2,805,394 | Hermach | Sept. 3, 1957 |
| 2,819,400 | Toth | Jan. 7, 1958 |

---

UNITED STATES PATENT OFFICE

CERTIFICATION OF CORRECTION

Patent No. 2,970,304 January 31, 1961

Emory Lakatos

It is hereby certified that error appears in the above numbered patent requiring correction and that the said Letters Patent should read as corrected below.

Column 7, line 55, after "direct" insert -- current --; column 8, line 2, strike out "signal therefrom"; column 11, line 10, for "absense" read -- absence --.

Signed and sealed this 22nd day of August 1961.

(SEAL)
Attest:

ERNEST W. SWIDER
Attesting Officer

DAVID L. LADD
Commissioner of Patents

UNITED STATES PATENT OFFICE

CERTIFICATION OF CORRECTION

Patent No. 2,970,304 January 31, 1961

Emory Lakatos

It is hereby certified that error appears in the above numbered patent requiring correction and that the said Letters Patent should read as corrected below.

Column 7, line 55, after "direct" insert -- current --; column 8, line 2, strike out "signal therefrom"; column 11, line 10, for "absense" read -- absence --.

Signed and sealed this 22nd day of August 1961.

(SEAL)
Attest:

ERNEST W. SWIDER
Attesting Officer

DAVID L. LADD
Commissioner of Patents